(12) United States Patent
Corbett et al.

(10) Patent No.: US 9,807,931 B2
(45) Date of Patent: Nov. 7, 2017

(54) MONITORING OF OPERATING MODES FOR HARVESTERS

(71) Applicant: DEERE & COMPANY, Moline, IL (US)

(72) Inventors: Daniel J. Corbett, Thibodaux, LA (US); Bryan E. Dugas, Napoleonville, LA (US)

(73) Assignee: Deere & Company, Moline, IL (US)

( * ) Notice: Subject to any disclaimer, the term of this patent is extended or adjusted under 35 U.S.C. 154(b) by 293 days.

(21) Appl. No.: 14/695,397

(22) Filed: Apr. 24, 2015

(65) Prior Publication Data

US 2015/0342118 A1    Dec. 3, 2015

Related U.S. Application Data

(60) Provisional application No. 62/005,712, filed on May 30, 2014.

(51) Int. Cl.
*G06F 7/70* (2006.01)
*A01D 41/127* (2006.01)
*A01D 45/10* (2006.01)

(52) U.S. Cl.
CPC ....... *A01D 41/127* (2013.01); *A01D 41/1274* (2013.01); *A01D 45/10* (2013.01)

(58) Field of Classification Search
CPC .. A01D 41/127; A01D 41/1274; A01D 45/10; A01D 41/141
USPC ............................................... 701/50; 56/228
See application file for complete search history.

(56) References Cited

U.S. PATENT DOCUMENTS

| | | | |
|---|---|---|---|
| 2009/0248258 A1* | 10/2009 | Fukumoto ............ | A01C 11/003 701/50 |
| 2010/0077715 A1* | 4/2010 | Hohlfeld .............. | A01D 43/081 56/228 |
| 2015/0237799 A1* | 8/2015 | Trowbridge ........ | F16H 61/4139 60/490 |

* cited by examiner

*Primary Examiner* — Thomas G Black
*Assistant Examiner* — Luke Huynh
(74) *Attorney, Agent, or Firm* — Lorenz & Kopf, LLP

(57) ABSTRACT

A method and control system are disclosed for monitoring operating modes of a harvester. A harvester may include one or more harvesting devices driven by one or more hydraulic circuits. A lower pressure limit and a current operating pressure may be determined for a hydraulic circuit of a harvesting device. The determined pressure limit and operating pressure may be compared, and a current operating mode for the harvester identified accordingly. The operating mode may include at least one of a waiting mode, a transport mode, a maneuvering mode, and a harvesting mode.

20 Claims, 6 Drawing Sheets

US 9,807,931 B2

MONITORING OF OPERATING MODES FOR HARVESTERS

CROSS-REFERENCE TO RELATED APPLICATION(S)

This application claims priority under 35 U.S.C. §119 to U.S. Provisional Application No. 62/005,712, filed May 30, 2014, the disclosure of which is incorporated herein by reference.

STATEMENT OF FEDERALLY SPONSORED RESEARCH OR DEVELOPMENT

Not applicable.

FIELD OF THE DISCLOSURE

This disclosure relates to monitoring the operating modes of various work vehicles, including sugarcane harvesters.

BACKGROUND OF THE DISCLOSURE

Harvesters of various types, including various sugarcane harvesters, may include harvesting devices of various types. Harvesting devices for a sugarcane harvester, for example, may include assemblies for cutting, chopping, sorting, transporting, and otherwise gathering and processing sugarcane plants. In certain sugarcane harvesters, such harvesting devices may include base cutter assemblies, feed rollers, cutting drums, and so on. In various harvesters, harvesting devices may be hydraulically powered by an engine-driven (or other) pump.

To actively harvest crops, a harvester may move along a field with harvesting devices engaged, the harvesting devices gathering and processing material from rows of crop plants. In the case of sugarcane harvesters, gathered sugarcane stalks may be chopped into billets for delivery to a trailing wagon, while leaves and trash may be separated from the billets and ejected into the field.

After harvesting a given row (or rows) of plants, it may sometimes be necessary to reposition a harvester before harvesting a new row (or rows). In some cases, the harvesting devices of the harvester may remain activated during this repositioning. Harvesters may also travel relatively long distances between different fields, storage locations, maintenance locations, and so on, and, at various times, may idle in place or otherwise hold position. For example, a harvester engaged in active harvesting within a field may sometimes pause its harvesting in order to wait for an empty wagon to arrive.

Operators of harvesters may be generally motivated to maximize active harvesting time, viewing excessive maneuvering, traveling, and waiting as undesirable due to the lack of productive gathering of crop, increased wear on the harvester's systems, ongoing consumption of fuel, and so on. Accordingly, it may be useful to monitor harvesters as they operate, in order to track and record the time spent in various activities. Existing monitoring systems for this purpose, however, may provide relatively limited and imprecise information. For example, systems assessing only the state of a harvesting switch may be limited to identification of only two broad classes of harvester activities and may not accurately capture the amount of time actually spent on such activities.

SUMMARY OF THE DISCLOSURE

A method and a control system are disclosed for monitoring various operating modes of a harvester. According to one aspect of the disclosure, a harvester may include one or more harvesting devices driven by one or more hydraulic circuits. A first lower pressure limit and a first current operating pressure may be determined for a hydraulic circuit of a first harvesting device. The determined first pressure limit and first operating pressure may be compared, and a current operating mode for the harvester identified accordingly. The operating mode may include at least one of a waiting mode, a transport mode, a maneuvering mode, and a harvesting mode.

In certain embodiments, various threshold pressures may be utilized in comparing the determined pressure limit and operating pressure. In certain embodiments, a second lower pressure limit and second current operating pressure may also be determined for a hydraulic circuit of a second harvesting device. Identifying of the operating mode may then be further based upon comparing the second pressure limit and the second operating pressure. In certain embodiments, identifying the operating mode may be further based upon a determined current ground speed of the harvester or a state of a harvesting switch of the harvester.

In certain embodiments, the one or more lower pressure limits may be updated continually during operation of the harvester. An initial pressure value may be determined for the relevant hydraulic circuit and compared to a current operating pressure of the circuit. Based upon this comparison, the relevant lower pressure limit may be updated to match the current operating pressure, or may be maintained at the initial pressure value.

In certain embodiments, aggregate time or distance information may be determined for various operating modes, and indicators of the operating modes or the aggregate times or distances may be displayed in various ways.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
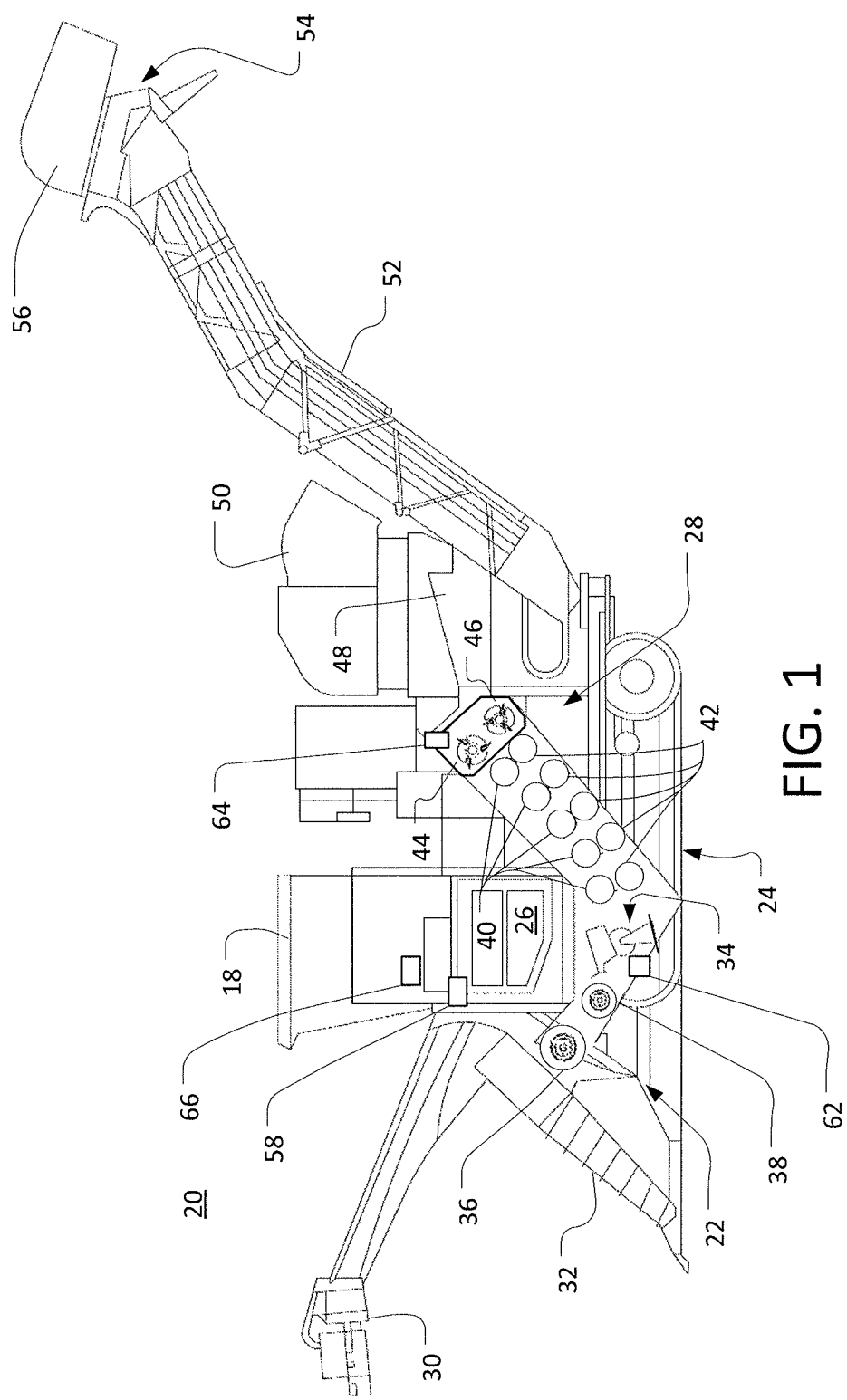
FIG. 1 is a side view of an example sugarcane harvester with an operating mode monitoring system.

The following describes one or more example embodiments of the disclosed control system and method for monitoring the operating states of harvesters, as shown in the accompanying figures of the drawings described briefly above. Various modifications to the example embodiments may be contemplated by one of skill in the art. Various example below may address sugarcane harvesters. It will be understood, however, that the disclosed system and method may be utilized with a variety of other harvester vehicles.

As noted above, a sugarcane harvester may engage in various activities during its operation. At various times and during certain activities, various harvesting devices of the harvester may be activated, in conjunction with other harvester systems. For example, during active harvesting of sugarcane plants, an engine of a harvester may provide power to drive a main hydraulic pump. The pump may be in communication with hydraulic circuits for various harvesting devices, and may accordingly pressurize the circuits to operate the harvesting devices. A harvester may also sometimes operate without harvesting devices activated, or in various other ways.

Generally, when a harvester is engaged with a particular activity or set of activities, the harvester may be viewed as operating in a particular operating mode (or "mode"). A harvester actively gathering and processing sugarcane from a field may be generally considered as operating in a "harvesting" mode. For example, a harvester traveling along a sugarcane row (or rows), with its harvesting devices actively gathering and processing sugarcane, may be viewed as operating in the harvesting mode. A harvester being positioned (or re-positioned) within a field, without actively gathering and processing sugarcane, may be considered as operating in a "maneuvering" mode. For example, a harvester that has reached the end of harvesting a first row may need to be repositioned to harvest a subsequent row. During this repositioning, the harvester may be considered as operating in the maneuvering mode even if its harvesting devices remain activated, because the harvester may not be actively gathering and processing sugarcane.

Other modes are also possible. A harvester traveling over a relatively long distance without actively harvesting sugarcane plants may be viewed as operating in a "transport" mode. For example, a harvester traveling along a road between fields, traveling across already-harvested fields, traveling to or from garages, and so on may be viewed as operating in the transport mode. A harvester with its engine operating, but engaged in little or no active travel may be viewed as operating in a "waiting" mode.

For various reasons, it may be it may be useful to monitor a harvester, or fleet of harvesters, by tracking the amount of time (or distance) allocated to various operating modes. For example, monitoring of a harvester may provide information regarding the relative amount of time (or distance) a harvester (or harvesters) has spent harvesting, maneuvering, waiting, and in transport. This information may then be used in order to improve aspects of sugarcane operations including field layout, fleet deployment, maintenance scheduling, and so on. For example, if a harvester is found to spend a relatively large amount of time maneuvering within a field (e.g., repositioning itself for active harvesting passes), this may suggest that a change in field layout or harvesting paths could increase the efficiency of the harvester's operation. Similarly, if a harvester is found to spend a relatively large amount of time waiting (e.g., stopping active harvesting in order to wait for an empty wagon), this may motivate more efficient management of wagon deployment, or an increase in the number of wagons utilized. (It will be understood that monitoring data also may be used for various other purposes.)

As noted above, existing monitoring systems may monitor the state of a harvesting switch in order to approximate time spent in various harvester activities. A harvesting switch may be a mechanical or other device within the cab of a harvester (or elsewhere), which may be toggled to activate or deactivate various harvesting devices of the harvester. As such, an operator may place a harvesting switch in an activated state to activate the hydraulically-driven operation of a base cutter assembly, feed rollers, and chopping drums (e.g., in order to actively harvest sugarcane) and may place the harvesting switch in a deactivated state to deactivate these devices (e.g., for transport of the harvester).

Existing systems may monitor the state of a harvesting switch, and record the amount of time during which the switch is engaged or disengaged as approximate times during which, respectively, the harvester is or is not in the harvesting mode. This approach may suffer from various problems, however. For example, simply monitoring the harvesting switch may fail to distinguish the maneuvering mode from other modes because an operator may not necessarily deactivate the harvesting switch during maneuvering (e.g., during repositioning of the harvester between harvesting passes). Alternatively, the maneuvering mode may be identified (e.g., if an operator deactivates the harvesting switch while maneuvering), but may not be distinguished from transport or waiting modes, because the harvesting switch may also tend to be deactivated during each of these modes. Further, operators may sometimes delay activating (or deactivating) the harvesting switch at the start (or end) of a harvesting pass, or may activate the harvesting switch some amount of time in advance of the start of active harvesting. This may result in inaccurate recording of timing by the switch-focused monitoring system. Similar issues may also result from monitoring systems focusing on the activation or deactivation of a harvester elevator.

The disclosed monitoring system and method may address these and other issues. Along with other functionality, the disclosed system and method may include determining and comparing various hydraulic pressures for the hydraulic circuits of various harvesting devices, and identifying a current operating mode based upon this pressure comparison.

In certain embodiments, one or more sensors may be utilized in order to determine the pressure of the hydraulic circuits of various harvesting devices of a harvester. For example, a first pressure transducer may be placed in communication with a hydraulic circuit for a base cutter assembly and a second transducer may be placed in communication with a hydraulic circuit for a set of chopper drums. (Monitoring of other hydraulic circuits, such as a circuit for powering various feed rollers or other harvesting devices, may also be possible.) By way of these various sensors, the pressures of the various harvesting device hydraulic circuits may be continually determined.

One or more of the determined pressures may then be compared to a lower pressure limit for the relevant circuit in order to identify not only whether the circuit has been activated (i.e., whether the harvesting device is operating), but also whether sugarcane material is being processed (or transported and so on) by the harvesting device. In this way, it may be determined whether the harvester is operating in the harvesting mode. For example, a particular hydraulic circuit for a harvesting device (e.g., a base cutter assembly, set of chopper drums, or other harvesting device) may exhibit a particular baseline pressure, or lower pressure limit, corresponding to activation of the circuit for operation of the harvesting device without active processing of sugarcane by the harvesting device (e.g., for rotating the harvesting device itself, rotating gear boxes to drive the relevant harvesting device, and so on). When the harvesting device is actively processing the sugarcane (e.g., actively cutting, chopping, transporting, and so on), the resistance of sugarcane moving past or through the harvesting device may cause the pressure of the relevant hydraulic circuit to increase past the lower pressure limit. Accordingly, through comparison of the current pressure of a particular hydraulic circuit to the appropriate lower pressure limit for the circuit (or various related pressure thresholds), a monitoring system may determine whether sugarcane is actively being processed by the associated harvesting device and, accordingly, whether the harvester is in harvesting mode.

In certain embodiments, as noted above, various different hydraulic circuits may be monitored, including hydraulic circuits for base cutter assemblies, chopper drums, feed rollers, or other harvesting devices. In certain embodiments, multiple hydraulic circuits may be monitored simultaneously (or otherwise) and a current operating mode identified based on pressures from each of the multiple circuits. For example, if the current pressure of a hydraulic circuit of one harvesting device (e.g., the circuit of a base cutter assembly) does not sufficiently exceed the relevant lower pressure limit, it may be useful to also analyze the current pressure of a different hydraulic circuit (e.g., the circuit for a set of chopper drums). Through comparison of the current pressures of both of these circuits, respectively, to the relevant lower pressure limit (or related threshold pressure), a monitoring system may, for example, distinguish between harvesting mode and maneuvering mode, even if the harvester is maneuvering with activated harvesting devices.

The disclosed monitoring system may additionally (or alternatively) monitor and analyze various other parameters. In certain embodiments, a monitoring system may identify a current operating mode for a harvester based upon ground speed. For example, if a harvester's engine is operating, but the harvester's ground speed is sufficiently small, the harvester may be determined to be in a waiting mode. In certain embodiments, a monitoring system may identify a current operating mode based upon the state of a harvesting switch. For example, if the harvester's ground speed is relatively large, but the harvesting switch is not activated, the harvester may be determined to be in a transport mode.

In certain embodiments, various of the above-noted parameters (or others) may be considered in combination in order to identify an operating mode for a harvester. For example, a monitoring system may determine vehicle speed, the state of the harvesting switch, and the current pressure of one or more hydraulic circuits, and collectively use this information to determine a current operating mode.

In certain embodiments, the lower pressure limit for a given hydraulic circuit may be updated continually (or otherwise) during operation of a harvester. It will be understood, for example, that changes in oil viscosity as the oil warms or cools, changes in oil level, changes in engine load, and so on, may result in changes to the baseline pressure of a particular hydraulic circuit. For example, due to the warming of hydraulic and gear oil as a harvester operates throughout the day, a particular hydraulic circuit may be activated (i.e., pressurized for operation) at lower and lower pressures. It may be useful to update the appropriate lower pressure limit for the monitoring system to reflect this change (and others).

In certain embodiments, timing information determined by a monitoring system (e.g., the amount of time a harvester has spent in each of the various operating modes) may be recorded and displayed in various ways. In certain embodiments, various aggregate times for various operating modes may be recorded. For example, the total amount of time for each of the harvesting, maneuvering, waiting and transport modes may be recorded for a particular day, a particular harvester, a particular harvesting season, a particular harvesting fleet, a particular field, a particular operator, and so on. In certain embodiments, timing information may be displayed to an operator (e.g., via a display in a harvester cab) or to other recipients (e.g., a fleet manager or a logistical management system). In certain embodiments, distance information may be determined (e.g., through conversion of timing information into distance information), in order to record and display the amount of distance traveled in various operating modes.

As will become apparent from the discussion herein, the disclosed system and method may be used advantageously in a variety of settings and with a variety of machinery. In certain embodiments, referring now to FIG. 1, the disclosed system and method may be implemented with regard to a sugarcane harvester 20. It will be understood, however, that the disclosed system and method may be used for various other vehicles or non-vehicle platforms, including various sugarcane harvesters of different configurations or designs than the sugarcane harvester 20 of FIG. 1.

The harvester 20 is presented in a side view in FIG. 1, with the front of the harvester 20 facing to the left. Accordingly, certain right-side components of the harvester 20 may not be visible in FIG. 1. The harvester 20 may include a main frame 22 supported on track assemblies 24 or wheels (not shown), with a cab 18 to house an operator. An engine 26 may supply power for driving the harvester along a field and for powering various driven components of the harvester 20. In certain embodiments, the engine 26 may directly power a main hydraulic pump (not shown) and various driven components of the harvester 20 may be powered by hydraulic motors (not shown) receiving hydraulic power from the main hydraulic pump via an embedded hydraulic system (not shown).

A cane topper 30 may extend forward of the frame 22 in order to remove the leafy tops of sugarcane plants (not shown), and a set of crop dividers 32 (only the left-side divider 32 shown in FIG. 1) may then guide the remainder of the sugarcane toward internal mechanisms of the harvester 20 for processing. As the harvester 20 moves across a field, plants passing between the crop dividers 32 may be deflected downward by an upper knockdown roller 36 and a lower knockdown roller 38 before being cut near the base of the plants by a base cutter assembly 34 mounted on the main frame 22. Rotating disks, guides, or paddles (not shown) on the base cutter assembly 34 may further direct the cut ends of the plants upwardly and rearward within the harvester 20 toward successive pairs of upper and lower feed rollers 40 and 42. The feed rollers 40 and 42 may be rotatably supported by a chassis 28 (e.g., a welded extension of the frame 22) in order to convey the stalks toward chopper drums 44 and 46 for chopping into relatively uniform billets. In certain embodiments, the feed rollers 40 and 42 may be included in a hydraulic circuit such that the feed rollers 40 and 42 may be rotatably driven by a hydraulic motor or other device (not shown).

The chopper drums 44 and 46 may rotate in opposite directions in order to chop the passing stalks into billets and propel the billets into a cleaning chamber 48 at the base of a primary extractor 50. The primary extractor 50 may then utilize a powered fan to extract trash and debris from the cleaning chamber 48, while allowing the billets of sugarcane stalks to drop onto a loading elevator 52 with a forward end located at the bottom of the cleaning zone 48. The loading elevator 52 may then convey the cleaned billets upward to a discharge location 54, below a secondary extractor 56, where the billets may be discharged into a trailing truck or other receptacle (not shown).

Various devices within the harvester 20 may be driven via hydraulic (or other) motors that are indirectly powered by the engine 26. For example, rotation of the cutting blades of the base cutter assembly 34 may be driven by one or more hydraulic motors (not shown) on a closed-loop base cutter hydraulic circuit (not shown), which may in turn be powered by the main hydraulic pump (not shown) driven by the engine 26. The hydraulic circuit for the base cutter assembly 34 may be distinct from the hydraulic circuit for other harvesting devices (e.g., the feed rollers 40 and 42 or other devices). In certain embodiments, a pressure transducer 62 (or other pressure sensing device) may be in communication with one or more parts of the base cutter hydraulic circuit in order to measure pressure within the circuit.

As another example, rotation of the chopper drums 44 and 46 may be driven by one or more hydraulic motors (not shown) on a closed-loop chopper drum hydraulic circuit (not shown), which may in turn be powered by the man hydraulic pump (not shown) driven by the engine 26. The hydraulic circuit for the chopper drums 44 and 46 may be distinct from the hydraulic circuit for other harvesting devices (e.g., the feed rollers 40 and 42, the base cutter assembly 34, or other devices). In certain embodiments, a pressure transducer 64 (or other pressure sensing device) may be in communication with one or more parts of the chopper drum hydraulic circuit in order to measure pressure within the circuit.

In certain embodiments, a harvesting switch 66 or other input device may be provided in the cab 18 (or elsewhere) to assist in controlling the chopper drum hydraulic circuit, the base cutter hydraulic circuit, or hydraulic circuits associated with other harvesting devices of the harvester 20. For example, when the harvesting switch 66 is in an activated state, the main hydraulic pump (not shown) may provide operational pressure to the chopper drum and base cutter hydraulic circuits (or other circuits) in order to drive the rotation of the base cutter blades and the chopper drums 44 and 46 (or other harvesting devices). Accordingly, in order to actually harvest sugarcane from a field, an operator may need to place the harvesting switch 66 in the activated state and thereby activate the appropriate hydraulic circuits for rotation of the base cutter blades, the chopper drums 44 and 46, and so on. Conversely, when the harvesting switch 66 is in a deactivated state, the main hydraulic pump (not shown) may not provide operational pressure to the chopper drum and base cutter hydraulic circuits (or other circuits). Accordingly, when an operator does not need to actively harvest sugarcane from a field, the operator may place the harvesting switch 66 in the deactivated state. It will be understood that charge pumps, or similar devices, may be utilized to provide appropriate charge pressure to various hydraulic circuits when the harvesting switch 66 is in a deactivated state. It will be further understood that a harvesting switch 66 may be a switching input device of various designs or forms and need not necessarily include an actual mechanical (or other) switch.

In certain embodiments, one or more control devices, such as controller 58, may be included in (or otherwise associated with) the harvester 20. The controller 58, for example, may include one or more computing devices including various processor devices and various associated memory architectures. In certain embodiments, the controller 58 may additionally (or alternatively) include various other control devices such as various electro-hydraulic valves and hydraulic circuits, various electronic control circuits and devices (e.g., various power electronics devices), and so on. In certain embodiments, the controller 58 (or another control device) may be in communication with various switches, controls and other interfaces or input devices (not shown) in the cab 18, as well as with various sensors, actuators, or other devices (not shown in FIG. 1) distributed throughout the harvester 20. For example, the controller 58 may be in communication with the pressure transducers 62 and 64, wheel speed sensors (not shown) and the harvesting switch 66 in the cab 18. In certain embodiments, the controller 58 (or another control device) may be a remotely located control device that communicates with various devices and systems of the harvester 20 via wireless or other communication means.

Various operations for monitoring the operating state of a sugarcane harvester (e.g., the harvester 20), including various of the operations described above, may be implemented as part of an operating mode monitoring ("OMM") method. Such a method may be implemented automatically (e.g., as controlled by the controller 58), manually (e.g., as controlled by an operator via various interfaces and input devices (not shown)), or as a combination of automatic and manual operations (e.g., as controlled manually by an operator via various input devices and automatically by the controller 58). It will be understood, accordingly, that an OMM method may be implemented using various computing devices or by various hydraulic, electronic, mechanical, electro-hydraulic, electro-mechanical, or other control devices, in various combinations. In certain embodiments, an OMM method (or portions thereof) may be implemented by controllers or other devices that are remotely located from a relevant harvester.

Figure 2:
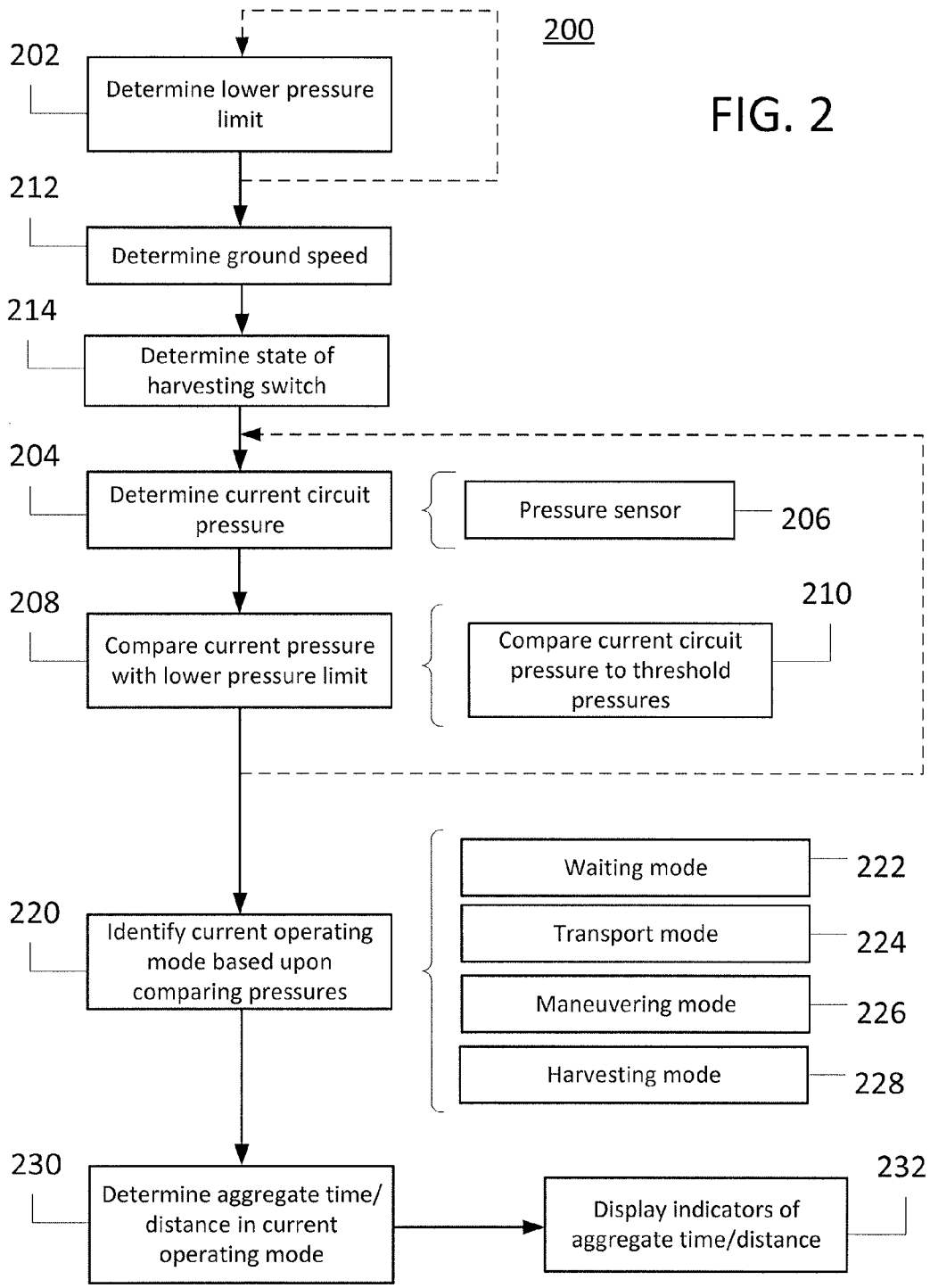
FIG. 2 is a diagrammatic view of aspects of a control method implemented by an operating mode monitoring system.

Referring also to FIG. 2, various operations of an example OMM method 200 are represented. In certain implementations, the OMM method 200 may include determining 202 a lower pressure limit for a hydraulic circuit associated with a particular harvesting device. As noted above, a lower pressure limit may represent the baseline pressure of a hydraulic circuit, at which pressure the circuit may power operation of the associated harvesting device (e.g., may power the turning of the gear box of the harvesting device) without the harvesting device actively processing sugarcane. For example, the lower pressure limit of a base cutter hydraulic circuit may be a hydraulic pressure at which the circuit drives rotation of the base cutter's blades via a base cutter gear box, in the absence of sugarcane to cut. Similarly, the lower pressure limit of a chopper drum hydraulic circuit may be a hydraulic pressure at which the circuit drives rotation of the chopper drums, in the absence of sugarcane stalks.

In certain implementations, a lower pressure limit may be determined 202 for one hydraulic circuit. For example, the lower pressure limit for a base cutter hydraulic circuit or a chopper drum hydraulic circuit may be determined 202. In certain implementations, a lower pressure limit may be determined 202 for each of a plurality of hydraulic circuits. For example, the lower pressure limit for each of a base cutter hydraulic circuit and a chopper drum hydraulic circuit may be determined 202. Lower pressure limits for multiple hydraulic circuits may be determined 202 simultaneously, sequentially, or otherwise.

Figure 3:
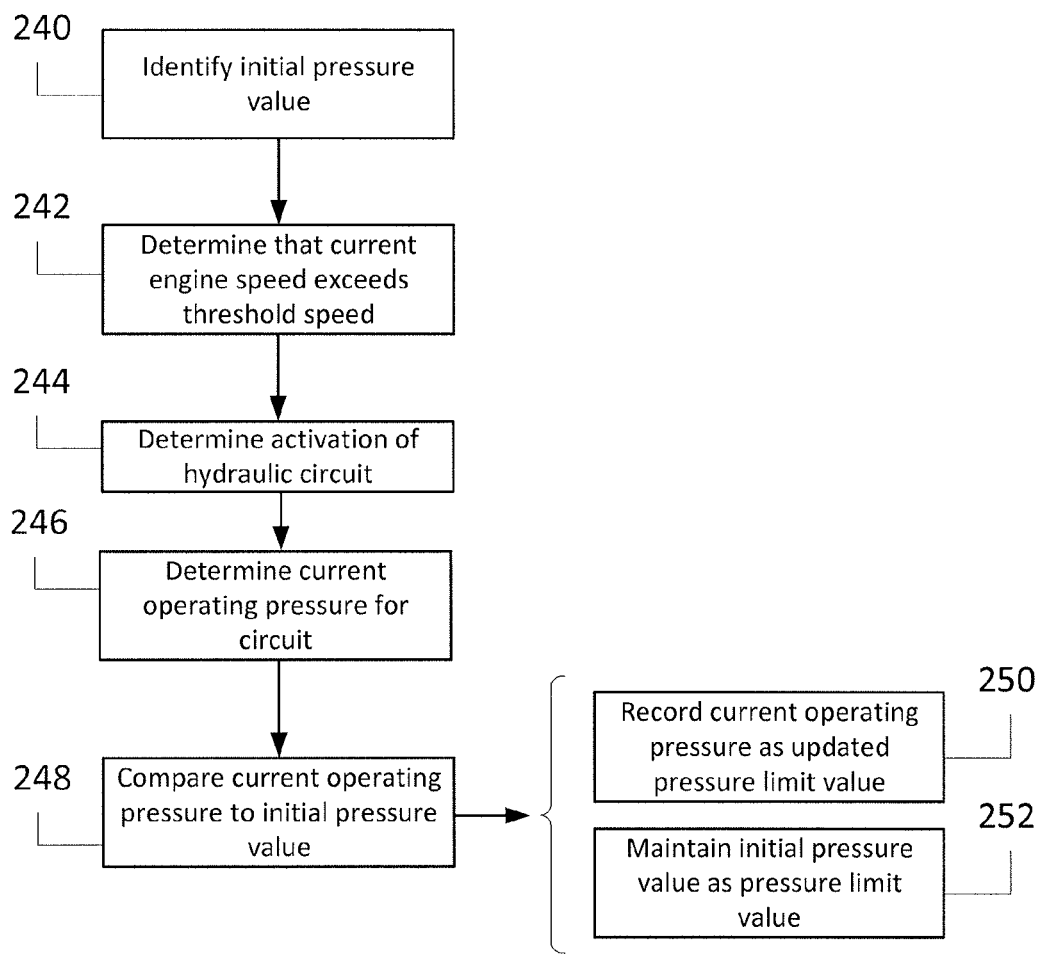
FIG. 3 is a diagrammatic view of further aspects of the control method of FIG. 2.

Various parameters may be determined and analyzed in order to appropriately determine 202 a lower pressure limit. For example, referring also to FIG. 3, determining 202 a lower pressure limit for a hydraulic circuit may include identifying 240 an initial pressure value for the circuit. In an initial determination 202 of a lower pressure limit (e.g., at the start of harvester operations for a particular day), the initial pressure value may be identified 240 as zero (or another initial reference pressure). In subsequent determinations 202 of a lower pressure limit, the initial pressure value may be identified 240 as a previously determined 202 lower pressure limit (e.g., the most recent previously determined 202 lower pressure limit).

Determining 202 a lower pressure limit also may include determining 242 whether the current engine speed exceeds a threshold engine speed. As noted above, the hydraulic circuits of various harvesting devices may be powered by an engine-driven pump. Accordingly, engine speed may serve as a useful indicator of flow from the pump to the various hydraulic circuits. Relatively low flow from the pump may result in relatively low pressures in the various hydraulic circuits, which may not correspond to the actual baseline pressure for activation of the circuits, even if, for example, a harvesting switch has been activated. Therefore, engine speed may also serve as a useful indicator of appropriate pressurization of the various circuits, with relatively low engine speeds (e.g., low idle speeds) suggesting that current pump flow may be inadequate to fully pressurize the circuits. In this light, in order to ensure that the determined 202 lower pressure limit may accurately reflect the baseline pressure for a particular circuit, determining 202 the lower pressure limit for a hydraulic circuit may usefully include determining 242 that the current engine speed is sufficiently high (e.g., is at least at a high idle).

Determining 202 a lower pressure limit also may include determining 244 that the relevant hydraulic circuit (e.g., a base cutter or chopper drum hydraulic circuit) has been activated. This may, for example, ensure that the determined 202 lower pressure limit represents a baseline pressure for an activated circuit and, accordingly, for an actively operating harvesting device. In certain embodiments, determining 244 whether the hydraulic circuit of a harvesting device has been activated may include determining the state of a harvesting switch. As noted above, a harvesting switch may be used to activate or deactivate various harvesting devices. Accordingly, by determining whether a harvesting switch has been activated, the method 200 may determine 244 whether an appropriate harvesting device (and hydraulic circuit) has also been activated.

Determining 202 a lower pressure limit also may include determining 246 a current operating pressure for the relevant hydraulic circuit. For example, once a hydraulic circuit has been activated, a pressure transducer in communication the relevant circuit may provide a pressure reading that corresponds to the current operating pressure of that circuit. It will be understood that various other direct and indirect pressure (or other) measurements may also be utilized to determine 246 a current operating pressure.

In certain embodiments, the method 200 may include a waiting period between determining 244 that a circuit has been activated and determining 246 a current operating pressure (or executing various other operations). When a hydraulic circuit is first activated (e.g., when a harvesting switch is first activated), there may be a transition period during which the circuit may exhibit various transient pressures. In order to avoid identifying these transients as the determined 202 lower pressure limit, it may be useful to delay certain operations (e.g., determining 246 current operating pressures) for some amount of time (e.g., 2-3 seconds).

Once the current operating pressure of a hydraulic circuit has been determined 246, the determined 246 current pressure may be compared 248 to the identified 240 initial pressure value. Depending on the results of this comparison 248, the method 200 may then include either recording 250 the determined 246 current operating pressure as an updated lower pressure limit, or maintaining 252 the identified 240 initial pressure value as the lower pressure limit.

The determined 246 current operating pressure and identified 240 initial pressure may be compared 248 in various ways. In certain implementations, the determined 246 current operating pressure may be recorded 250 as an updated lower pressure limit if the current operating pressure exceeds the identified 240 initial pressure value. In certain implementations, the determined 246 current operating pressure may be recorded 250 as an updated lower pressure limit if the current operating pressure falls below the identified 240 initial pressure value. In certain implementations, the determined 246 current operating pressure may be recorded 250 as an updated lower pressure limit if the determined 246 current pressure falls within a particular pressure band that exceeds the identified 240 initial pressure value. For example, if the determined 246 current pressure exceeds the identified 240 initial pressure by more than a first threshold amount, but less than a second threshold amount, the determined 246 current operating pressure may be recorded 250 as the new lower pressure limit. In certain implementations, the determined 246 current operating pressure may be recorded 250 as an updated lower pressure limit if the determined 246 current pressure is less than the identified 240 initial pressure value by more than a third threshold amount. The various thresholds and pressure bands for comparing 250 the various pressures may be selected based upon various considerations, and may be calibrated to reflect particular operating conditions, harvesters, harvesting devices, hydraulic circuits, and so on.

In certain implementations, if the relevant criteria for comparing 248 the various pressures are not met (e.g., if the determined 246 current operating pressure does not fall within a particular pressure band exceeding the identified 240 initial pressure or the identified 240 initial pressure does not exceed the determined 246 current operating pressure by an appropriate amount), the identified 240 initial pressure value may then be maintained 252 as the lower pressure limit.

In certain implementations, appropriate lower pressure limits for various hydraulic circuits may be determined 202 continually (or at specified intervals) during operation of a sugarcane harvester. For example, an updated lower pressure limit may be determined 202 at each clock cycle of a relevant processor, or with various other timings. As noted above, for example, changes in oil viscosity, operating conditions, and so on, throughout a work period, may result in changes to the baseline pressure for various hydraulic circuits. Changes in oil levels (e.g., due to maintenance work on a harvester, oil leaks, and so on) and other factors may also affect the baseline pressure for a particular circuit. Accordingly, it may be useful to continually (or otherwise) update the lower pressure limit throughout the operation of a particular harvester, in order to ensure that the lower pressure limit for a particular hydraulic circuit accurately reflects the baseline pressure for the circuit under current conditions.

As one advantage, the above-noted operations for determining 202 lower pressure limits may allow the OMM method 200 to operate reliably despite possible changes to, and uncertainties with, various harvester systems. For example, these operations may allow an accurate lower pressure limit to be determined 202 regardless of wear levels in relevant bearings, variations in oil fill levels, whether oil viscosity is known (or known with acceptable accuracy), and so on.

Referring again to FIG. 2, the OMM method 200 also may include determining 204 a current operating pressure of a hydraulic circuit for a relevant harvesting device. For example, based on signals from one or more pressure sensors 206 (or other sensors or sensor assemblies), the current operating pressure of a base cutter hydraulic circuit or a chopper drum hydraulic circuit may be determined 204. In certain implementations, various filters or other signal processing may be employed in order to eliminate unwanted fluctuations or other noise from a relevant pressure signal. For example, a low pass filter may be employed with respect to a particular pressure transducer in order to remove high-frequency pressure fluctuations from a pressure signal before determining 204 the current operating pressure.

As noted above, the OMM method 200 may include determining 204 current operating pressures for a number of hydraulic circuits associated with a number of harvesting devices. For example, current operating pressures may be determined 204, respectively, for the hydraulic circuits of each of a base cutter assembly, a set of chopper drums, a set of feed rollers, and so on. In certain implementations, multiple operating pressures may be determined 204 relatively simultaneously. In certain implementations, the operating pressure for a first hydraulic circuit may be determined 204 first, and other operating pressures of other hydraulic circuits 204 determined subsequently, with a timing based on various factors.

In order to further assess the current state of a harvesting device, the OMM method 200 also may include comparing 208 the determined 204 current operating pressure to the relevant determined 202 lower pressure limit. This comparison 208 may facilitate an assessment of whether the relevant hydraulic circuit is activated, as well as whether the associated harvesting device is also actively processing or transporting sugarcane. In certain embodiments, the determined 204 operating pressures of various numbers of hydraulic circuits may be compared 208 to various lower pressure limits, as determined 202, respectively, for the relevant hydraulic circuits. For example, the determined 204 current operating pressure of one or both of a base cutter hydraulic circuit and a chopper drum hydraulic circuit may be compared 208, respectively, to the determined 202 lower pressure limit for each circuit. In this way, for example, the OMM method 200 may facilitate a determination of whether the harvesting device associated with each these circuits (i.e., a base cutter assembly and set of chopper drums, respectively) is actively processing sugarcane, or whether the harvesting devices have been activated but are not processing sugarcane.

Based upon, at least in part, the comparison 208 of relevant pressures, the current operating mode of the harvester may be identified 220. For example, depending on the result of the comparison 208 of lower pressure limits and current operating pressures, the current operating mode of the harvester may be determined 220 to include one of a waiting mode 222, a transport mode 224, a maneuvering mode 226, and a harvesting mode 228 (as defined above).

As discussed in greater detail below, comparing 208 a determined 204 current operating pressure to a determined 202 lower pressure limit may include comparing 210 the determined 204 current operating pressure with one or more threshold pressures. In certain embodiments, the OMM method 200 may include multiple instances of comparing 208 relevant pressures, and multiple instances of comparing 210 these pressures to relevant threshold values. For example, a lower pressure limit may be determined 202 for each of multiple hydraulic circuits (e.g., a chopper drum hydraulic circuit and a base cutter hydraulic circuit), a current operating pressure may be determined 204 for each of the circuits, and the corresponding various current operating pressures and lower pressure limits may be compared 208 for each of the circuits. In certain implementations, this comparison 208 may include, comparing 210 each of these determined 204 pressures to one or more corresponding pressure thresholds.

In certain implementations, the OMM method 200 may include various other operations, and may determine and analyze various other information in order to identify 220 a current operating mode for a harvester. For example, in certain implementations, the OMM method 200 may include determining 212 a current ground speed of the harvester (or a related parameter), and identifying 220 the current operating mode may be based upon, at least in part, the determined 212 ground speed. Similarly, in certain implementations, the OMM method 200 may include determining 214 a current state of a harvesting switch (as also described above), and identifying 220 the current operating mode may be based upon, at least in part, the determined 214 switch state.

Figure 4:
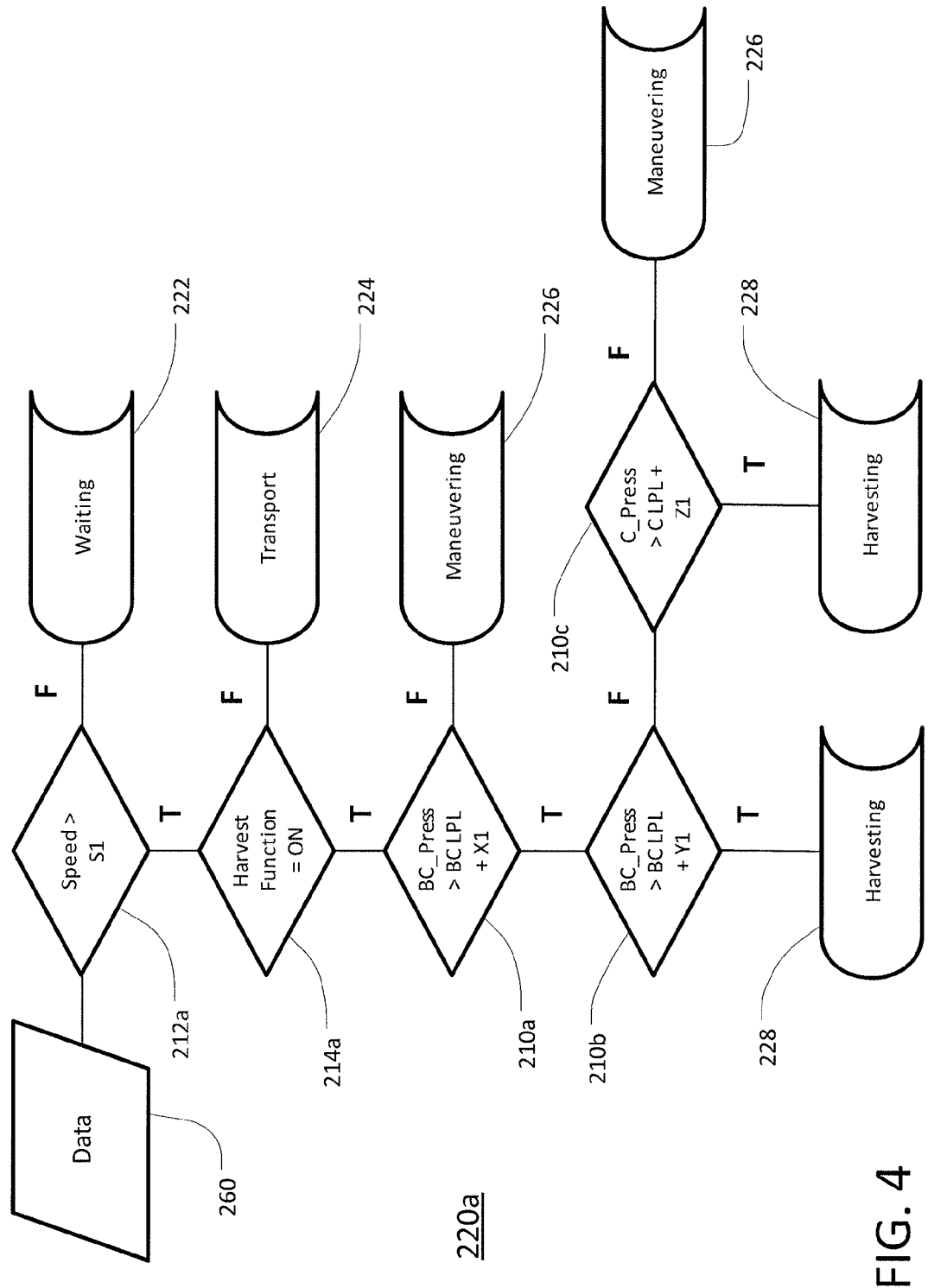
FIG. 4 is a diagrammatic view of an example decision tree implemented by the control method of FIG. 2.

Referring also to FIG. 4, an example decision tree that may be implemented by the OMM method 200 is depicted. Various data 260 may be received (e.g., at the controller 58), including readings from various pressure sensors 206, readings from engine speed or ground speed sensors, readings from sensors associated with a harvesting switch, and so on. If the engine speed does not exceed a particular threshold, the engine may not be operating (or may not be operating with sufficient power) and the harvester may be assumed to not be operating in any mode. If the harvester is not moving above a particular speed, the harvester may be assumed not to be harvesting, maneuvering, or in transport. Accordingly, the ground speed may be compared 212a with a threshold speed S1 and if the ground speed does not exceed S1, the OMM method 200 may identify 220 that the harvester is operating in the waiting mode 222.

The OMM method 200 also may include determining 214a the state of a relevant harvesting switch (i.e., determining 214a whether the harvesting devices of the harvester have been activated). If the harvesting switch has not been activated, but the ground speed exceeds S1, the harvester may be identified 220 as operating in the transport mode 224. If the harvesting switch has been activated, however, and the ground speed exceeds S1, the harvester may be considered as operating in either of the maneuvering mode 226 or the harvesting mode 228.

As noted above, the OMM method 200 may include comparing 210 various determined 204 current operating pressures to one or more threshold pressures. Still referring to FIG. 4, for example, a determined 204 operating pressure for a base cutter hydraulic circuit ("BC_Press") may be compared 210a to a first threshold equal to the determined 202 lower pressure limit for the base cutter hydraulic circuit ("BCLPL") plus the pressure value X1. If the determined 204 base cutter operating pressure does not exceed this first threshold, this may indicate that little (or no) sugarcane material is being processed by the base cutter (even though the base cutter has been activated by the harvesting switch), and the harvester may be identified 220 as operating in the maneuvering mode 226.

If the determined 204 base cutter operating pressure exceeds the first threshold, this may indicate that the base cutter is actively engaged in cutting sugarcane and, accordingly, that the harvester is operating in the harvesting mode 228. However, in certain cases, various transient phenomenon may result in the determined 204 base cutter pressure exceeding the first threshold even when the harvester is not actively harvesting. Accordingly, in certain implementations, it may be useful to compare 210*b* the determined 204 base cutter operating pressure to a second threshold. In certain implementations, the second threshold may be equal to the relevant determined 202 lower pressure limit plus the pressure value Y1, with Y1 being greater than X1. If the determined 204 base cutter operating pressure exceeds this second, larger threshold, the harvester may then be identified 220 as operating in the harvesting mode 228.

If the determined 204 base cutter operating pressure does not exceed the second threshold, it may be useful to consider another hydraulic circuit (and harvesting device) in the identification 220 of the current operating mode. For example, a current operating pressure and a lower pressure limit for a chopper drum hydraulic circuit may also be determined 204, 202. The determined 204 current operating pressure for the chopper drum hydraulic circuit ("C_Press") may then be compared 210*c* to a third threshold equal to the determined 202 lower pressure limit for the chopper drum hydraulic circuit ("CLPL") plus the pressure value Z1. The pressure value Z1 may be the same as, or different from, the pressure values X1 and Y1 noted above. If the determined 204 chopper drum operating pressure exceeds this third threshold, the chopper drums may be viewed as actively processing sugarcane and the harvester may be identified 220 as operating in the harvesting mode 228. However, if the determined 204 chopper drum operating pressure does not exceed the third threshold, the chopper drums may be viewed as not actively processing sugarcane (even if the chopper drum hydraulic circuit has been activated), and the harvester may be identified 220 as operating in the maneuvering mode 226.

Figure 5:
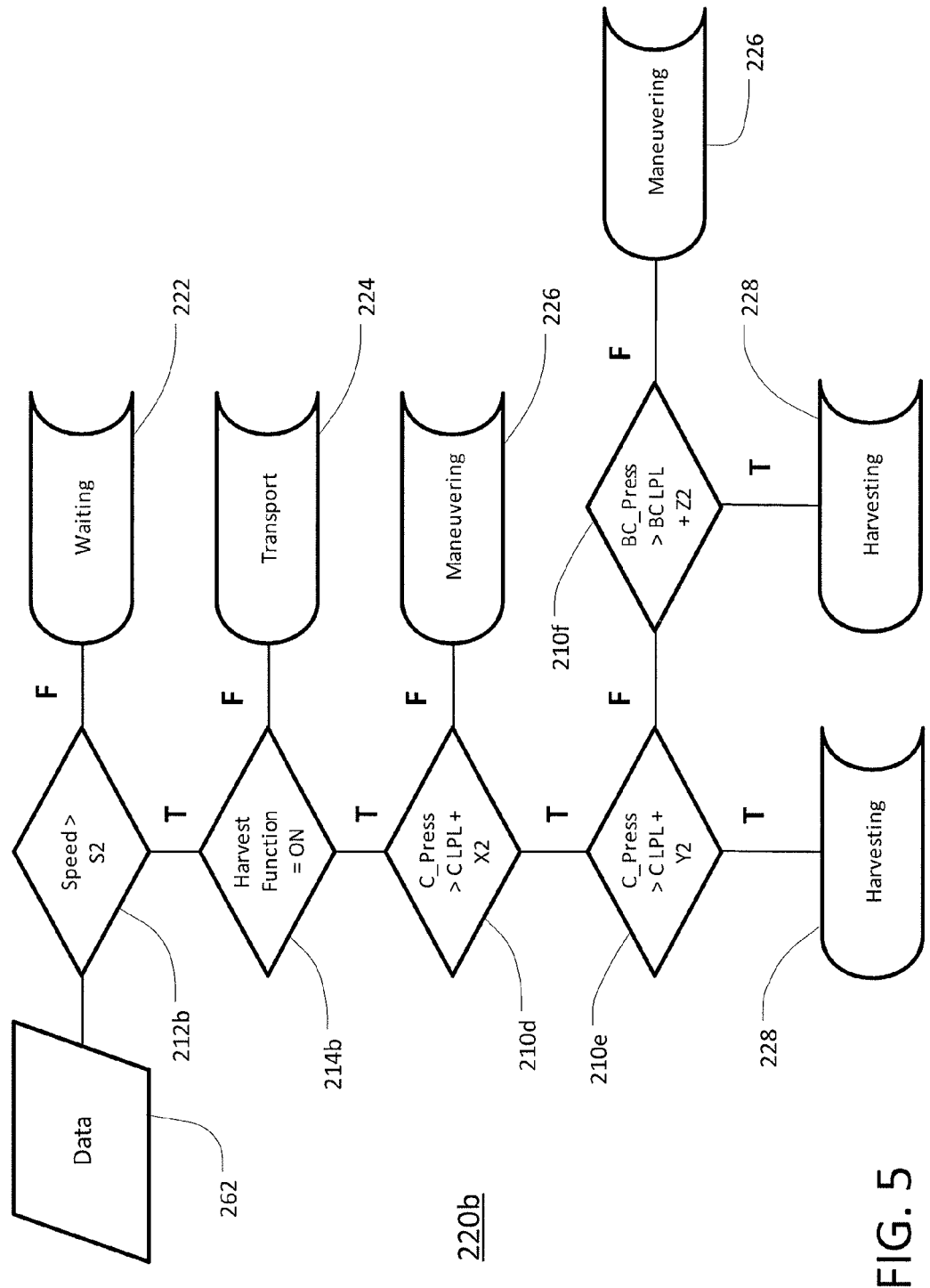
FIG. 5 is a diagrammatic view of another example decision tree implemented by the control method of FIG. 2.

Referring also to FIG. 5, another example decision tree that may be implemented by the OMM method 200 is depicted. Various data 262 may be received (e.g., at the controller 58), including readings from various pressure sensors 206, readings from engine speed or ground speed sensors, readings from sensors associated with a harvesting switch, and so on. As also described above, if the engine speed does not exceed a particular threshold, the engine may not be operating (or may not be operating with sufficient power) and the harvester may be assumed to not be operating in any mode. Similarly, if the harvester is not moving above a particular speed, the harvester may be assumed not to be harvesting, maneuvering, or in transport. Accordingly, the ground speed may be compared 212*b* with a threshold speed S2 and if the ground speed does not exceed S2, the OMM method 200 may identify 220 that the harvester is operating in the waiting mode 222. It will be understood that the threshold speed S2 may be the same as the threshold speed S1 or may be different from S1.

The OMM method 200 also may include determining 214*b* the state of a relevant harvesting switch (i.e., whether the harvesting devices of the harvester have been activated). If the harvesting switch has not been activated, but the ground speed exceeds S2, the harvester may be identified 220 as operating in the transport mode 224. If the harvesting switch has been activated, however, and the ground speed exceeds S1, the harvester may be considered as operating in either of the maneuvering mode 226 or the harvesting mode 228.

As noted above, the OMM method 200 may include comparing 210 various determined 204 current operating pressures to one or more threshold pressures. Still referring to FIG. 5, for example, a determined 204 operating pressure for a chopper drum hydraulic circuit may be compared 210*d* to a first threshold equal to a determined 202 lower pressure limit for the chopper drum hydraulic circuit plus the pressure value X2. If the determined 204 chopper drum operating pressure does not exceed this first threshold, this may indicate that little (or no) sugarcane material is being processed by the chopper drums (even though the chopper drums have been activated by the harvesting switch), and the harvester may be identified 220 as operating in the maneuvering mode 226. It will be understood that the pressure value X2 may be the same as the pressure value X1 or may be different from X1.

If the determined 204 chopper drum operating pressure exceeds the first threshold, this may indicate that the chopper drum is actively engaged in cutting sugarcane and, accordingly, that the harvester is operating in the harvesting mode 228. However, in certain cases, various transient phenomenon may result in the determined 204 chopper drum pressure exceeding the first threshold even when the harvester is not actively harvesting. Accordingly, in certain implementations, it may be useful to compare 210*e* the determined 204 chopper drum operating pressure to a second threshold. In certain implementations, the second threshold may be equal to the relevant determined 202 lower pressure limit plus the pressure value Y2, with Y2 being greater than X2. If the determined 204 chopper drum operating pressure exceeds this second, larger threshold, the harvester may then be identified 220 as operating in the harvesting mode 228. It will be understood that the pressure value Y2 may be the same' as the pressure value Y1 or may be different from Y1.

If the determined 204 chopper drum operating pressure does not exceed the second threshold, it may be useful to consider another hydraulic circuit (and harvesting device) in the identification 220 of the current operating mode. For example, a current operating pressure and a lower pressure limit for a base cutter hydraulic circuit may also be determined 204, 202. The determined 204 current operating pressure for the base cutter hydraulic circuit may then be compared 210*f* to a third threshold equal to the determined 202 lower pressure limit for the base cutter hydraulic circuit plus the pressure value Z2. The pressure value Z2 may be the same, or different, from the pressure values X2 or Y2 noted above, and may be the same, or different, from the pressure value Z1. If the determined 204 base cutter operating pressure exceeds this third threshold, the base cutter may be viewed as actively processing sugarcane and the harvester may be identified 220 as operating in the harvesting mode 228. However, if the determined 204 base cutter operating pressure does not exceed the third threshold, the base cutters may be viewed as not actively processing sugarcane (even if the base cutter hydraulic circuit has been activated), and the harvester may be identified 220 as operating in the maneuvering mode 226.

Once identified 220, the operating mode of a harvester may be utilized in various ways. In certain embodiments, the OMM method 200 may include determining 230 aggregate amounts of time or distance over which a harvester operates in a particular identified 220 mode. For example, a timing circuit integrated into the controller 58 may track the amount of time a harvester operates in each of the waiting mode 222, transport mode 224, maneuvering mode 226 and harvesting mode 228. This aggregate operating mode information may then be stored in various known ways (including remotely from the harvester) for further analysis. In certain embodiments, the aggregate distance in each operating mode may be determined 230 based upon the aggregate time in each operating mode. For example, the OMM method 200 may include recording the current ground speed of a harvester throughout various operations, correlating the recorded ground speeds with the identified 220 operating modes, then, for each operating mode, integrating the recorded ground speeds for each mode over the time spent in that mode to determine 230 the corresponding distance traveled. In this way, the OMM method 200 may include determining 230 both the aggregate times and the aggregate distances for various operating modes. In certain implementations, the distance traveled in each mode may alternatively (or additionally) be determined 230 independent of the determination 230 of aggregate time.

Figure 6:
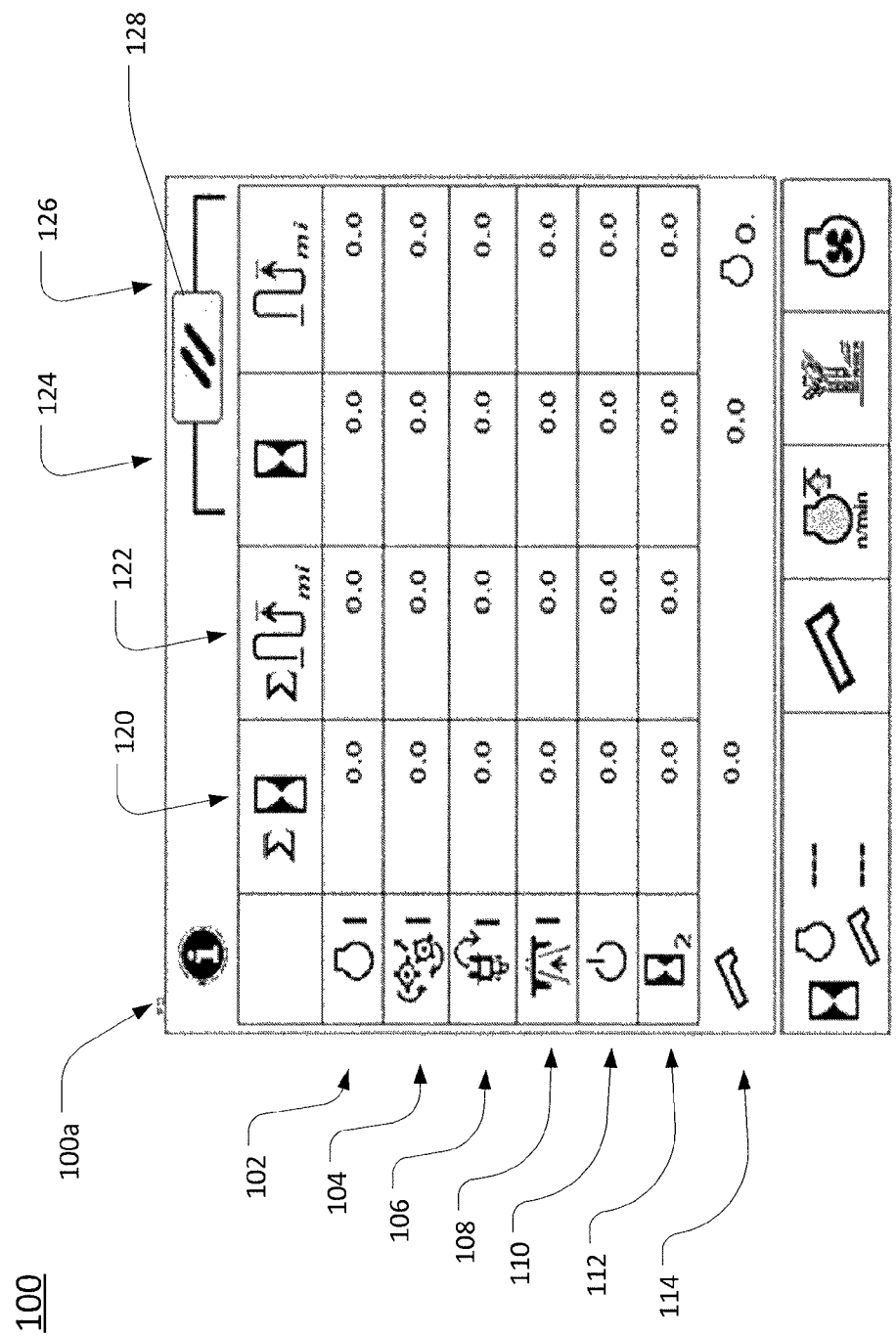
FIG. 6 is a view of an example output display for an operating mode monitoring system.

In certain implementations, the OMM method 200 also may include displaying 232 various indicators of the determined 230 aggregate time or distance values, as well as various other information. Referring also to FIG. 6, for example, a display device 100 may be utilized to display 232 various types of information on display 100*a*. The device 100 may, for example, be a touchscreen or other display device in a cab of a harvester or in a central control location. In the implementation depicted, the display 100*a* may be caused to display 232 columns 120 and 122, which may indicate, respectively, the total amount of time in a particular mode and the total distance traveled in a particular mode. The display 100*a* may also be caused to display 232 columns 124 and 126, which may indicate, respectively, the amount of time in a particular mode and the distance traveled in a particular mode for a particular portion of harvester operation (e.g., aggregate times and distances in various modes for a particular operator, particular field, particular day, and so on). An action button 128 may be used to reset the columns 124 and 126 (e.g., when a new operator begins to operate the harvester, when the harvester enters a new field, at the start of a new day, and so on).

Each of the columns 120 through 126 may be divided into various rows, in which information from the OMM method 200 may be displayed 232. Row 102 may display 232 the time (or distance) over which the harvester engine is on, and row 104 may display 232 the time (or distance) over which the harvester is in harvesting mode 228. Row 106 may display 232 the time (or distance) over which the harvester is in maneuvering mode 226, and row 108 may display 232 the time (or distance) over which the harvester is in transport mode 224. Row 110 may display 232 the time (or distance) over which the harvester is in waiting mode 222. In certain implementations, row 112 may display 232 the time (or distance) over which the harvester has not been determined to be in any of the various operating modes 222, 224, 226 or 228. Row 114 may display 232 the time (or distance) over which the harvester elevator has been activated.

As will be appreciated by one skilled in the art, certain aspects of the disclosed subject matter may be embodied as a method, system, (e.g., a work vehicle control system included in the harvester 20) or computer program product. Accordingly, certain embodiments may be implemented as hardware, as software (including firmware, resident software, micro-code, etc.), as a combination of software and hardware, or otherwise. Furthermore, certain embodiments may take the form of a computer program product on a computer-usable storage medium having computer-usable program code embodied in the medium.

Any suitable computer-usable or computer-readable medium may be utilized. The computer-usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer-readable signal medium may be non-transitory and may be any computer-readable medium that is not a computer-readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions (or otherwise). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Relevant computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

Relevant computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, combinations of special purpose hardware and computer instructions, or otherwise.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A method for monitoring operating modes of a harvester, the harvester including a first hydraulic circuit for driving a first harvesting device, the method comprising:
   determining a first lower pressure limit for the first hydraulic circuit;
   interfacing one or more controllers with a pressure sensor operably coupled to the first hydraulic circuit to determine a first current hydraulic pressure for the first hydraulic circuit;
   comparing, via the one or more controllers, the first current hydraulic pressure to the first lower pressure limit; and
   identifying, via the one or more controllers, a current operating mode for the harvester, based upon, at least in part, the comparing of the first current hydraulic pressure to the first lower pressure limit;
   wherein the current operating mode includes one of a waiting mode, a transport mode, a maneuvering mode, and a harvesting mode.

2. The method of claim 1, further comprising:
   determining one or more of a current ground speed of the harvester, a current engine speed for the harvester, and a state of a harvesting switch of the harvester, the harvesting switch being configured to activate and deactivate the first hydraulic circuit based upon the state of the harvesting switch;
   wherein the identifying of the current operating mode for the harvester is further based upon, at least in part, the one or more of the current ground speed, the current engine speed, and the state of the harvesting switch.

3. The method of claim 2, wherein, if the current ground speed of the harvester does not exceed a threshold speed, the identifying of the current operating mode includes identifying the waiting mode as the current operating mode; and
   wherein, if the current ground speed exceeds the threshold speed and the state of the harvesting switch indicates a deactivated state of the first hydraulic circuit, the identifying of the current operating mode includes identifying the transport mode as the current operating mode.

4. The method of claim 1, wherein the comparing of the first current hydraulic pressure to the first lower pressure limit includes comparing the first current hydraulic pressure to a first threshold pressure, the first threshold pressure being based upon, at least in part, first lower pressure limit; and
   wherein the identifying of the current operating mode for the harvester is further based upon, at least in part, the comparing of the first current hydraulic pressure to the first threshold pressure.

5. The method of claim 4, wherein, if the first current hydraulic pressure does not exceed the first threshold pressure, the identifying of the current operating mode includes identifying the maneuvering operating mode as the current operating mode; and
   wherein, if the first current hydraulic pressure exceeds the first threshold pressure, the identifying of the current operating mode includes identifying one of the maneuvering mode and the harvesting mode as the current operating mode.

6. The method of claim 5, wherein, if the first current hydraulic pressure exceeds the first threshold pressure, the comparing of the first current hydraulic pressure to the first lower pressure limit further includes comparing the first current hydraulic pressure to a second threshold pressure, the second threshold pressure being based upon, at least in part, the first lower pressure limit and being larger than the first threshold pressure;
   wherein the identifying of the current operating mode for the harvester is further based upon, at least in part, the comparing of the first current base hydraulic pressure to the second threshold pressure; and
   wherein, if the first current hydraulic pressure exceeds the second threshold pressure, the identifying of the current operating mode includes identifying the harvesting mode as the current operating mode.

7. The method of claim 6, wherein the harvester further includes a second hydraulic circuit for driving a second harvesting device, the method further comprising:
   determining a second lower pressure limit for the second hydraulic circuit;
   interfacing the one or more controllers with a second pressure sensor operably coupled to the second hydraulic circuit to determine a second current hydraulic pressure for the second hydraulic circuit; and
   if the first current hydraulic pressure does not exceed the second threshold pressure, comparing the second current hydraulic pressure to a third threshold pressure, the third threshold pressure being based upon, at least in part, the second lower pressure limit;
   wherein, if the second current hydraulic pressure exceeds the third threshold pressure, and if the first current hydraulic pressure exceeds the first threshold pressure, the identifying of the current operating mode includes identifying the harvesting mode as the current operating mode; and wherein, if the second current hydraulic pressure does not exceed the third threshold pressure, and if the first current hydraulic pressure does not exceed the second threshold pressure, the identifying of the current operating mode includes identifying the maneuvering mode as the current operating mode.

8. The method of claim 1, wherein the determining of the first lower pressure limit includes:
    identifying an initial lower pressure limit value for the first lower pressure limit;
    determining that a current engine speed exceeds a threshold engine speed;
    determining that the first hydraulic circuit has been activated;
    determining a current operating pressure for the first hydraulic circuit; and
    comparing the current operating pressure to the identified initial lower pressure limit value;
    wherein:
    if the current operating pressure is smaller than the initial lower pressure limit value by more than a first predetermined amount, the current operating pressure is recorded as an updated pressure value for the first lower pressure limit;
    if the current operating pressure is larger than the initial lower pressure limit value by more than a second predetermined amount and by less than a third predetermined amount, the current operating pressure is recorded as the updated pressure value for the first lower pressure limit; and
    otherwise, the first lower pressure limit is maintained at the initial lower pressure limit value.

9. The method of claim 1, further comprising updating the first lower pressure limit in a continual manner during operation of the harvester.

10. The method of claim 1, further comprising:
    determining one or more of an aggregate amount of time in the current operating mode and an aggregate distance traveled by the harvester in the current operating mode; and
    displaying, via a display device, one or more indicators of the one or more of the aggregate amount of time and the aggregate distance traveled.

11. A control system for monitoring operating modes of a sugarcane harvester, the sugarcane harvester including a base cutter hydraulic circuit for driving a base cutter and a chopper drum hydraulic circuit for rotating one or more chopper drums, the control system comprising:
    at least one pressure sensor in communication with one or more of the base cutter and chopper drum hydraulic circuits; and
    one or more controllers configured to:
        determine one of a base cutter circuit lower pressure limit for the base cutter hydraulic circuit and a chopper drum circuit lower pressure limit for the chopper drum circuit;
        interface with the at least one pressure sensor to determine one of a current base cutter hydraulic pressure for the base cutter hydraulic circuit and a current chopper drum hydraulic pressure for the chopper drum hydraulic circuit, respectively;
        compare the one of the current base cutter and chopper drum hydraulic pressures, respectively, to the one of the base cutter circuit and chopper drum circuit lower pressure limits; and
        identify a current operating mode for the sugarcane harvester, based upon, at least in part, the comparing of the one of the current base cutter and chopper drum hydraulic pressures to the one of the base cutter circuit and chopper drum circuit lower pressure limits;
    wherein the current operating mode includes one of a waiting mode, a transport mode, a maneuvering mode, and a harvesting mode.

12. The control system of claim 11, wherein the one or more controllers are further configured to:
    determine one or more of a current ground speed of the sugarcane harvester, a current engine speed for the harvester, and a state of a harvesting switch of the sugarcane harvester, the harvesting switch being configured to activate and deactivate one or more of the base cutter hydraulic circuit and the chopper drum hydraulic circuit based upon the state of the harvesting switch;
    wherein the identifying of the current operating mode for the sugarcane harvester is further based upon, at least in part, the one or more of the current ground speed, the current engine speed, and the state of the harvesting switch.

13. The control system of claim 12, wherein, if the current ground speed of the sugarcane harvester does not exceed a threshold speed, the identifying of the current operating mode includes identifying the waiting mode as the current operating mode; and
    wherein, if the current ground speed exceeds the threshold speed and the state of the harvesting switch indicates a deactivated state of the one or more of the base cutter hydraulic circuit and the chopper drum hydraulic circuit, the identifying of the current operating mode includes identifying the transport mode as the current operating mode.

14. The control system of claim 11, wherein the comparing of the one of the current base cutter and chopper drum hydraulic pressures, respectively, to the one of the base cutter circuit and chopper drum circuit lower pressure limits includes comparing the one of the current base cutter and chopper drum hydraulic pressures, respectively, to one of a first base cutter threshold pressure and a first chopper drum threshold pressure, the first base cutter and chopper drum threshold pressures being based upon, at least in part, the base cutter circuit and chopper drum circuit lower pressure limits, respectively;
    wherein the identifying of the current operating mode for the sugarcane harvester is further based upon, at least in part, the comparing of the one of the current base cutter and chopper drum hydraulic pressures to, respectively, the one of the first base cutter and chopper drum threshold pressures.

15. The control system of claim 14, wherein, if the one of the current base cutter and chopper drum hydraulic pressures does not exceed, respectively, the one of the first base cutter and chopper drum threshold pressures, the identifying of the current operating mode includes identifying the maneuvering mode as the current operating mode; and
    wherein, if the one of the current base cutter and chopper drum hydraulic pressures exceeds, respectively, the one of the first base cutter and chopper drum threshold pressures, the identifying of the current operating mode includes identifying one of the maneuvering mode and the harvesting mode as the current operating mode.

16. The control system of claim 15, wherein if the one of the current base cutter and chopper drum hydraulic pressures exceeds, respectively, the one of the first base cutter and chopper drum threshold pressures, the comparing of the one of the current base cutter and chopper drum hydraulic pressures, respectively, to the one of the base cutter circuit and chopper drum circuit lower pressure limits further includes comparing the one of the current base cutter and chopper drum hydraulic pressures, respectively, to one of a second base cutter threshold pressure and a second chopper drum threshold pressure, the second base cutter and chopper drum threshold pressures being based upon, at least in part, the base cutter circuit and chopper drum circuit lower pressure limits, respectively, and being larger, respectively, than the first base cutter and chopper drum threshold pressures;

wherein the identifying of the current operating mode for the sugarcane harvester is further based upon, at least in part, the comparing of the one of the current base cutter and chopper drum hydraulic pressures, respectively, to the one of the second base cutter and chopper drum threshold pressures; and wherein, if the one of the current base cutter and chopper drum hydraulic pressures exceeds, respectively, the one of the second base cutter and chopper drum threshold pressures, the identifying of the current operating mode includes identifying the harvesting mode as the current operating mode.

17. The control system of claim 16, wherein the one or more controllers are further configured to:

determine an other one of the current base cutter hydraulic pressure and the current chopper drum hydraulic pressure;

determine, respectively, an other one of the base cutter circuit lower pressure limit for the base cutter hydraulic circuit and the chopper drum circuit lower pressure limit for the chopper drum circuit; and if the one of the current base cutter and chopper drum hydraulic pressures does not exceed, respectively, the one of the second base cutter and chopper drum threshold pressures, compare the other one of the current base cutter and chopper drum hydraulic pressures to, respectively, one of a third base cutter threshold pressure and a third chopper drum threshold pressure, the third base cutter and chopper drum threshold pressures being based upon, at least in part, the other one of the base cutter circuit and chopper drum circuit lower pressure limits, respectively;

wherein, if the other one of current base cutter and chopper drum hydraulic pressures exceeds, respectively, the one of the third base cutter and chopper drum threshold pressures, and if the one of the current base cutter and chopper drum hydraulic pressures exceeds, respectively, the one of the first base cutter and chopper drum threshold pressures, the identifying of the current operating mode includes identifying the harvesting mode as the current operating mode; and wherein, if the other one of current base cutter and chopper drum hydraulic pressures does not exceed, respectively, the one of the third base cutter and chopper drum threshold pressures, and if the one of the current base cutter and chopper drum hydraulic pressures does not exceed, respectively, the one of the second base cutter and chopper drum threshold pressures, the identifying of the current operating mode includes identifying the maneuvering mode as the current operating mode.

18. The control system of claim 11, wherein the determining of the one of the base cutter circuit and chopper drum circuit lower pressure limits includes:

identifying an initial pressure value for the one of the base cutter circuit and chopper drum circuit lower pressure limits;

determining that a current engine speed exceeds a threshold engine speed;

determining, respectively, that one of the base cutter and chopper drum hydraulic circuits has been activated;

determining a current operating pressure for the one of the base cutter and chopper drum circuits; and comparing the current operating pressure to the identified initial pressure value;

wherein:

if the current operating pressure is smaller than the initial pressure value by more than a first predetermined amount, the current operating pressure is recorded as an updated pressure value for the one of the base cutter circuit and chopper drum circuit lower pressure limits;

if the current operating pressure is larger than the initial pressure value by more than a second predetermined amount and by less than a third predetermined amount, the current operating pressure is recorded as the updated pressure value for the one of the base cutter circuit and chopper drum circuit lower pressure limits; and otherwise, the one of the base cutter circuit and chopper drum circuit lower pressure limits is maintained at the initial pressure value.

19. The control system of claim 11, wherein the one or more controllers are further configured to:

update the one of the base cutter circuit and chopper drum circuit lower pressure limits in a continual manner during operation of the sugarcane harvester.

20. The control system of claim 11, wherein the one or more controllers are further configured to:

determine one or more of an aggregate amount of time in the current operating mode and an aggregate distance traveled by the sugarcane harvester in the current operating mode; and display, via a display device, one or more indicators of the one or more of the aggregate amount of time and the aggregate distance traveled.

* * * * *